United States Patent [19]

Jensen et al.

[11] Patent Number: 4,963,778
[45] Date of Patent: Oct. 16, 1990

[54] FREQUENCY CONVERTER FOR CONTROLLING A MOTOR

[75] Inventors: Niels D. Jensen; Kaj Kruse; Peder Jensen, all of Bjerringbro, Denmark

[73] Assignee: Grundfos International A/S, Denmark

[21] Appl. No.: 485,782

[22] Filed: Feb. 22, 1990

Related U.S. Application Data

[63] Continuation of Ser. No. 315,201, Feb. 23, 1989, abandoned, which is a continuation of Ser. No. 131,713, Dec. 11, 1987, abandoned.

[30] Foreign Application Priority Data

Dec. 13, 1986 [DE] Fed. Rep. of Germany ....... 3642724

[51] Int. Cl.⁵ ............................................. H02K 11/00
[52] U.S. Cl. .................................... 310/68 D; 310/63; 310/89; 310/160
[58] Field of Search ................. 310/68 D, 89, 91, 160, 310/161, 67 R, 63

[56] References Cited

U.S. PATENT DOCUMENTS

| | | |
|---|---|---|
| 3,299,303 | 1/1967 | Newill et al. ........................ 310/66 |
| 4,510,404 | 4/1985 | Barrett et al. ....................... 310/89 |
| 4,554,473 | 11/1985 | Muller ............................. 310/68 D |
| 4,659,951 | 4/1987 | Angi et al. ........................ 310/67 R |
| 4,668,898 | 5/1987 | Harms et al. ...................... 310/68 D |

FOREIGN PATENT DOCUMENTS

| | | |
|---|---|---|
| 3045610 | 8/1982 | Fed. Rep. of Germany . |
| 3332515 | 3/1985 | Fed. Rep. of Germany . |
| 3443024 | 6/1986 | Fed. Rep. of Germany . |
| 1505161 | 5/1975 | United Kingdom . |
| 2046029 | 11/1980 | United Kingdom . |
| 1603976 | 12/1981 | United Kingdom . |
| 2167608 | 11/1985 | United Kingdom . |
| 2173253 | 3/1986 | United Kingdom . |

Primary Examiner—Steven L. Stephan
Assistant Examiner—Jeffrey Sterrett
Attorney, Agent, or Firm—Michael N. Meller

[57] ABSTRACT

The present invention relates to an electromotor where its operational values, such as speed and torque, can be changed by means of a static frequency converter. The invention relates further to an electromotor combined with and driving a working unit such as a pump, a ventilator a machine tool or a tool. The frequency converter miniaturized by means of a high-integrated circuit is mechanically connected to form a structural unit with the motor or the working unit, and the dissipation heat of the frequency converter is emitted, preferably by means of ducted cooling, and the metal parts surrounding the frequency converter form the electric shielding thereof.

2 Claims, 7 Drawing Sheets

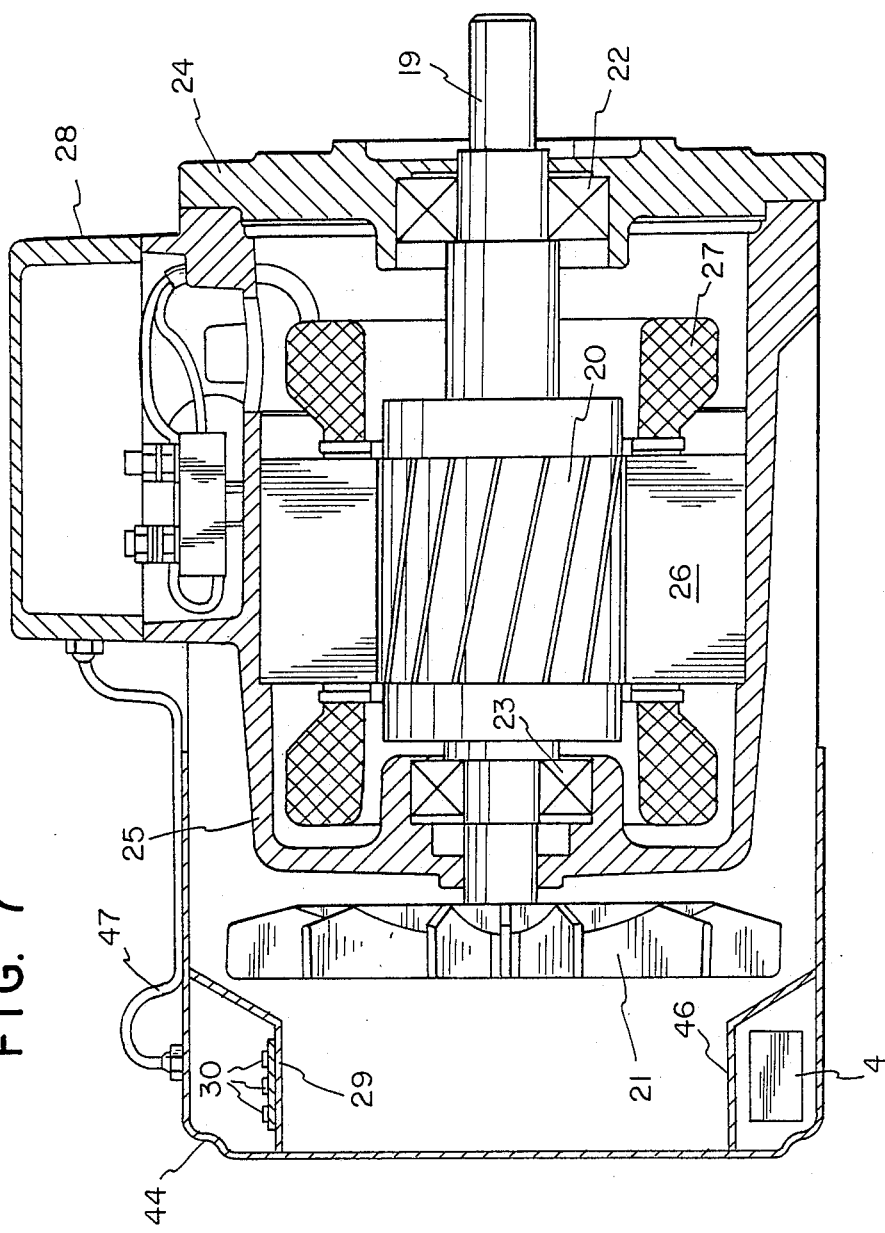

FREQUENCY CONVERTER FOR CONTROLLING A MOTOR

This application is a continuation, of application Ser. No. 315201, filed Feb. 12, 1989 now abandoned, which is a continuation, of application Ser. No. 131713, filed Dec. 11, 1987 now abandoned.

FIELD OF THE INVENTION

The present invention relates to an electromotor where its operational values, such as speed and torque, can be changed by means of a static frequency converter, and especially an electromotor combined with and driving a working unit, such as a pump, a ventilator, a machine tool or a tool.

BACKGROUND ART

Controlling the speed or torque of an electromotor with a frequency converter permits a substantially lossfree adjustment of the motor to the requirements of the working unit driven by said motor. This applies especially to an arrangement with pumps and ventilators as working units, where the requirements of the arrangement change with respect to the variable delivery.

Externally installed static frequency converters are box-like devices emitting their dissipation heat to the ambient usually by free convection at a power range of up to approx. 100 kW. Owing to insufficient heat transmission the surfaces of such a device have to be large. Consequently the device itself becomes rather large, due to the fact that frequency converter requires an average volume of between 0.005 and 0.01 $m^3/kW$ at a power range of up to 100 kW.

It is thus necessary to install a frequency converter separately. Owing to the comparatively long cables between the frequency converter and the electromotor this results in interferences caused by electromagnetic fields. In the future this will cause even heavier shielding because of government requirements. Furthermore, the mobility of the motor is curtailed by the large construction of the frequency converter. Finally the costs of such a frequency converter operating in low-power ranges will exceed those of the motor.

SUMMARY OF THE INVENTION

The object of the invention is to provide an electromotor controlled by a frequency converter, said electromotor being inexpensively manufacturable and universally applicable, where the above disadvantages are avoided and where no problems arise with regard to electric shielding and emission of dissipation heat because of the special type and installation of the frequency converter.

In satisfaction of the foregoing object and advantages the electromotor is according to the invention provided with a frequency converter miniaturized by means of a highly integrated circuit mechanically connected to form a structural unit with the motor or the working unit, and the dissipation heat of the frequency converter is emitted, preferably by means of ducted cooling, and the metal parts surrounding the frequency converter form the electric shielding thereof.

The size of the frequency converter is determined by the difference in temperature between the electronic equipment of the frequency converter acting as heat source and the ambient acting as dissipator, on the one hand, and the heat resistance on the way from the heat source to the dissipator, on the other hand. The heat transmission coefficient is increased by one to two orders of magnitude and the size of the frequency converter is consequently reduced to a fraction of the size of known frequency converters installed at a distance from the motor, when said frequency converter is installed at places where there is thought to be convection for emitting dissipation heat owing to the construction of the motor or where ducted cooling can be installed. Experiments have shown that a further miniaturization can be achieved by employ highly-integrated circuits and, for example, field-controlled transistors for the output circuit of the frequency converter.

Due to these measures it is possible to connect the frequency converter directly to the motor or an assembly including a motor and a working unit providing a small, mobile and inexpensively manufacturable unit without long, shielded cables. Such an arrangement shows no further shielding problems, since the metal parts of the motor and the assembly surrounding the frequency converter serve as shielding without involving further expenditure.

Furthermore, the output signal of the frequency converter and thus the operational values of the motor are controlled by affecting the control of said frequency converter by means of internal or external sensors, measuring, for example, temperature, voltage or current in the output circuit of the frequency converter or reacting to, for example, pressure, flow, temperature or the like of a working unit driven by said motor. Moreover, the predetermined operating temperature of the motor windings determines the preset maximum permissible operational value.

One possible place for installing the frequency converter is the terminal box of the motor. In order to obtain a better cooling by ambient air the terminal box is spaced from the motor housing. In order to improve the emission of heat the terminal box is furthermore provided with cooling ribs or the terminal box is separately cooled.

If the frequency converter is provided with an intermediate circuit for operating with current accumulation and/or voltage accumulation, said frequency converter includes an input circuit, an intermediate circuit and an output circuit. There are, however, also direct converters operating without intermediate circuits. It is possible to arrange said circuits individually or in groups mutually spaced from each other. The input and output circuits of the frequency converter, for example, are situated inside the terminal box, whereas the intermediate circuit is situated on the outside of the motor housing. This results in a further miniaturization of the frequency converter, since a capacitor or an inductance acting as intermediate circuit is rather voluminous.

If the inductance of the frequency converter forming the intermediate circuit is arranged separately from the input and output circuits the inductance is a coil situated inside the motor housing and surrounding the motor shaft, the input and output circuits forming a module situated on or inside said motor housing.

Furthermore all the above circuits of the frequency converter can form a module. Moreover the module can be situated inside the ventilator housing of the motor, for example, between the rotor of the motor and the motor housing. If the module is suitably arranged the air flow caused by the rotor consequently absorbs the dissipation heat of the frequency converter, emitting it to the ambient.

Finally it is advantageous to form the module as housings and inserts carrying contacts and plugs on the outside for providing as necessary the connections to motor windings, sensors and the like by means of plugging in or inserting of the module.

If the motor is run by means of a solar collector the input circuit of the frequency converter can, of course, be replaced by a dc current source operating with photovoltaic effect. In this case the input circuit of the frequency converter is externally arranged, while the output circuit and the optionally used intermediate circuit are, for example, installed inside the motor or ventilator housing.

BRIEF DESCRIPTION OF THE DRAWINGS

The invention is described in greater detail below in with reference to the accompanying drawings, in which FIG. 1 shows the circuit diagram of the frequency converter and FIGS. 2–7 are schematic and simplified axial sections through the electromotor with different arrangements of the frequency converter.

DESCRIPTION OF THE PREFERRED EMBODIMENTS

Figure 1:
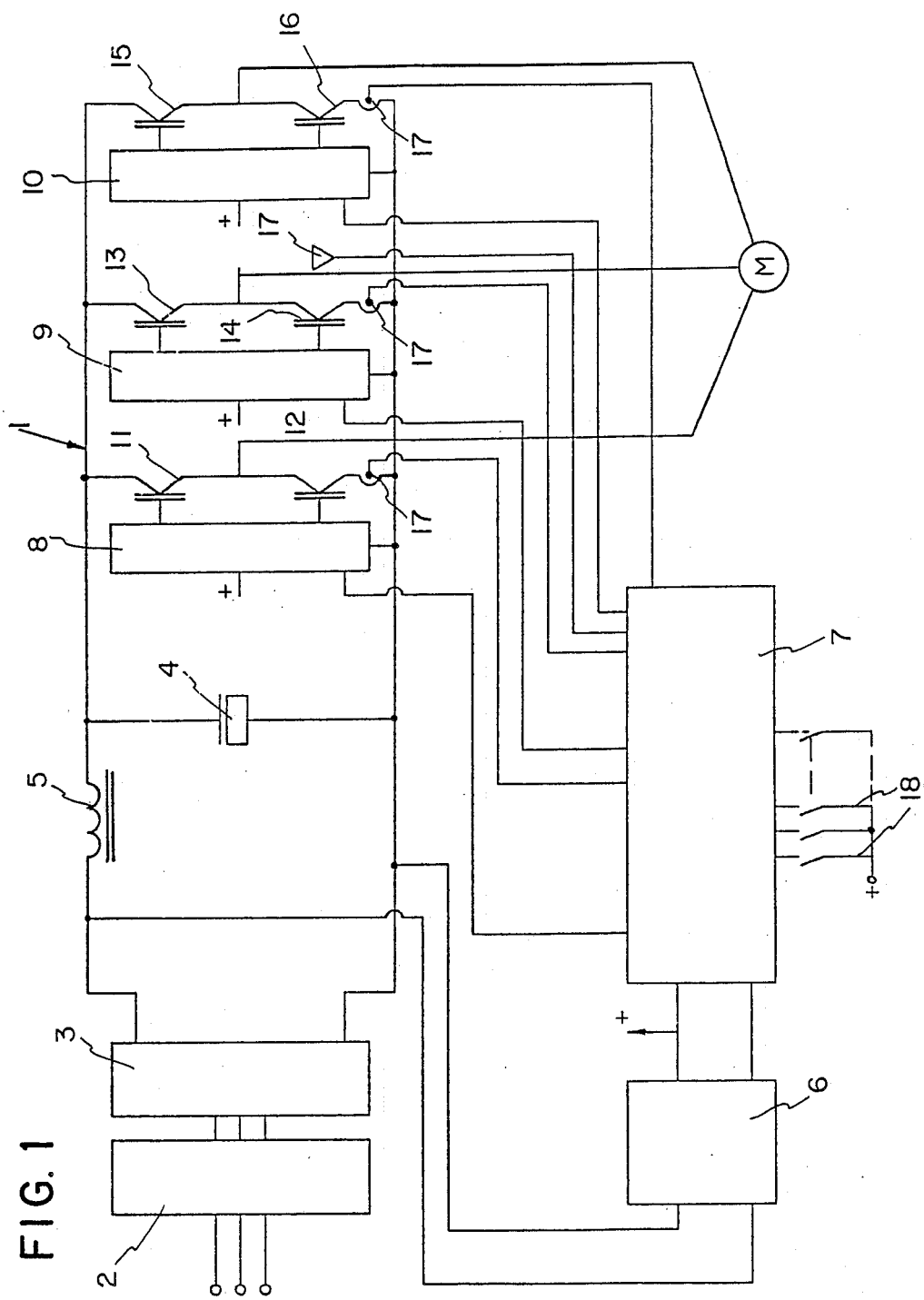

The known frequency converter shown in FIG. 1 is supplied by a three-phase ac supply system. The input side is provided with an interference filter 2 and a rectifier in the form of an ac/dc transformer 3. These two components form the input circuit. The intermediate circuit comprises a capacitor 4 and an inductance 5, since the frequency converter in this embodiment operates with voltage accumulation as well as current accumulation. Replacing the inductance 5 by an ordinary connection results in a system only working with voltage accumulation while the replacement of the capacitor 4 by an ordinary connection results in a system exclusively working with current accumulation.

Moreover, the frequency converter comprises a dc/dc transformer 6 and a controller 7, controlling the driver stages 8, 9 and 10, where power transistors 11–16 are connected in pairs. These components and groups form the output circuit of the frequency converter. They are known in type and function and do not require further explanation. The motor M with its windings is also connected to the output circuit.

Furthermore the frequency converter is provided with internal sensors 17, such as those reacting to current, voltage or temperature, or external sensors and servo components connected to the controller 7. Such external sensors react, for example, to pressure, volume flow and temperature of a pump driven by the motor. External servo components are, for example, time components for switching off and on certain operational modes of the frequency converter for predetermined periods of time. Finally, the frequency converter can be provided with circuit elements or switches 18 for affecting prepared circuits in the controller 7 by opening or closing said switches. Thus the output signal of said frequency converter is altered, for example, with respect to its amplitude or its frequency.

The motors illustrated in FIGS. 2–7 are a synchronous squirrel cage motors. Since these motors are principally the same and coincide with respect to their essential components in all examples, the same reference numerals are used for corresponding components to simplify the subsequent description. The same applies with respect to the illustrated frequency converters if their components have corresponding tasks and functions.

Rotor sheets 20 and a rotor 21 are attached to a shaft 19. Said shaft is carried by bearings 22, 23, their non-rotating parts being supported by a motor cover 24 and a motor housing 25 respectively.

The parts of the stator are also attached to said housing 25. These include predominantly stator sheets 26 and motor windings 27. Outside on the housing is the terminal box 28, the mains cable being inserted in a manner known per se. Said cable is also attached to contacts, the other end of which is connected to the motor windings 27. The frequency converter or at least parts thereof can also be arranged in the terminal box 28, as described below.

Figure 2:
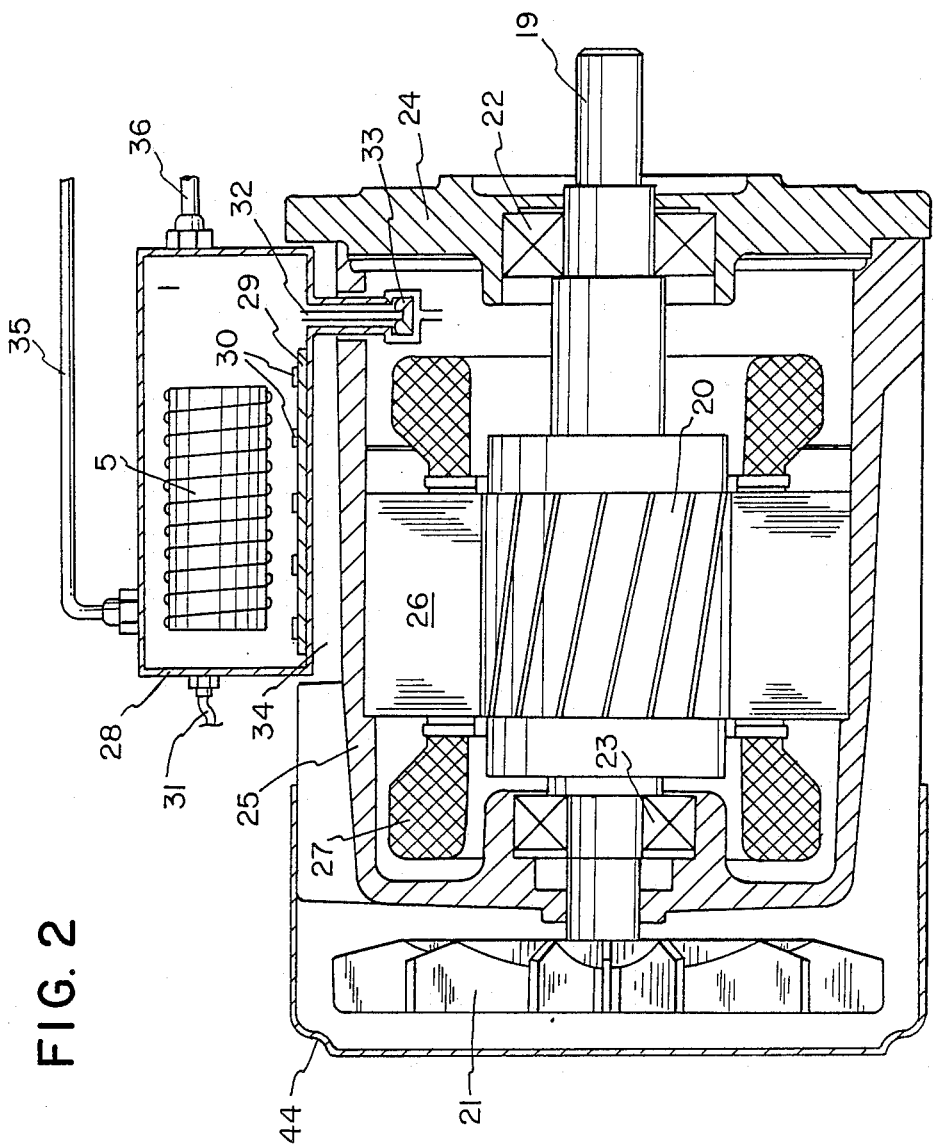

In the embodiment of FIG. 2 the entire frequency converter is situated in the terminal box 28. In this embodiment, the converter includes the inductance 5 and a support plate 29 constituting the intermediate circuit. The support plate holds the input and output circuits of the frequency converter here indicated by the boxes 30. The input circuit is connected to the power supply via a cable 31. This cable can also establish the connection between the motor windings and the power supply. The output circuit of the frequency converter is connected to plugs 32, said plugs being connected to the contacts 33 in the motor by slipping on the terminal box 28 in a manner known per se. The contacts 33 are connected to the ends of the windings 27 so as to enable the control of the speed of the motor by means of the frequency converter.

The terminal box 28 is situated at a predetermined distance from the motor housing 25, creating a free space 34. A part of the cooling air flows through the space 34, absorbing the dissipation heat from the electronic equipment of the frequency converter at the surface of the terminal box and emitting it.

It is further possible to achieve an effective ducted cooling by introducing a coolant into the terminal box 28 via the line 35 to absorb the dissipation heat and subsequently carry off said coolant via the line 36. If the coolant is a liquid dielectric, such as oil, it can be in direct contact with the electric components of the frequency converter. In the case of a conductive coolant, the coolant is led through the terminal box in a closed circuit.

As mentioned before the circuits of the frequency converter can be arranged either individually or in groups mutually spaced from each other. The capacitor 4 forming the intermediate circuit of the frequency converter is attached outside the terminal box 28 and connected to the input and output circuits 30 inside the terminal box via a shielded cable 37, cf. FIG. 3. When slipping on the terminal box said circuits are connected to corresponding counter contacts via the plugs 38 for connecting the output circuit of the frequency converter to the motor windings 27.

Figure 3:
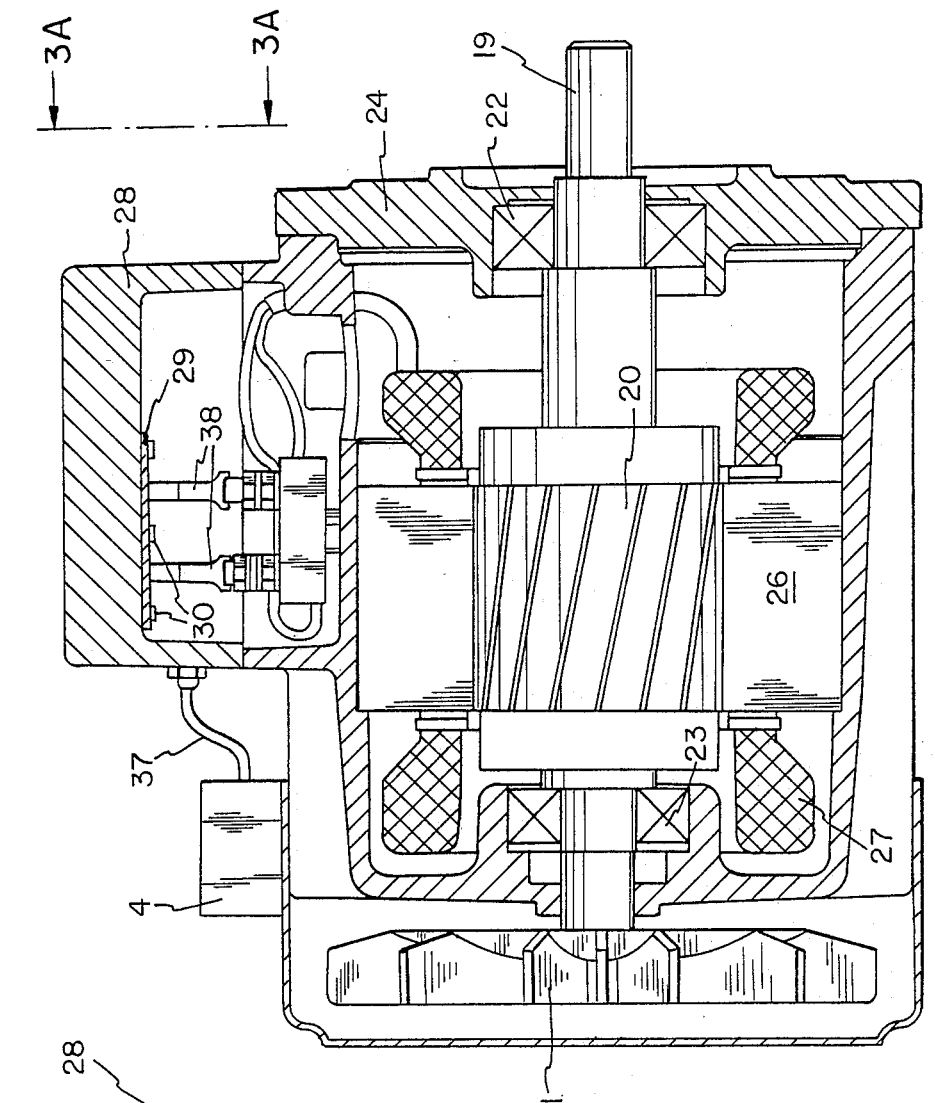
Figure 3A:
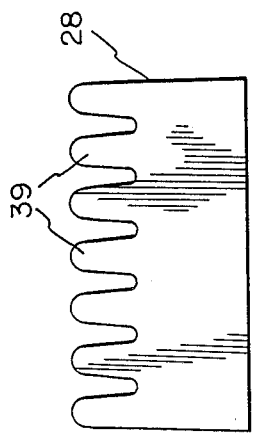

The frequency converter or the terminal box can also in this case be provided with ducted cooling as in the embodiment of FIG. 2, if it is insufficient to provide the surface of the terminal box 28 with cooling ribs 39, cf. schematic view A—A in the left-hand corner of FIG. 3. The cooling ribs increase the heat exchange surface of the terminal box 28 to the ambient. Especially at comparatively low power ranges they suffice to emit the dissipation heat of the frequency converter.

Figure 4:
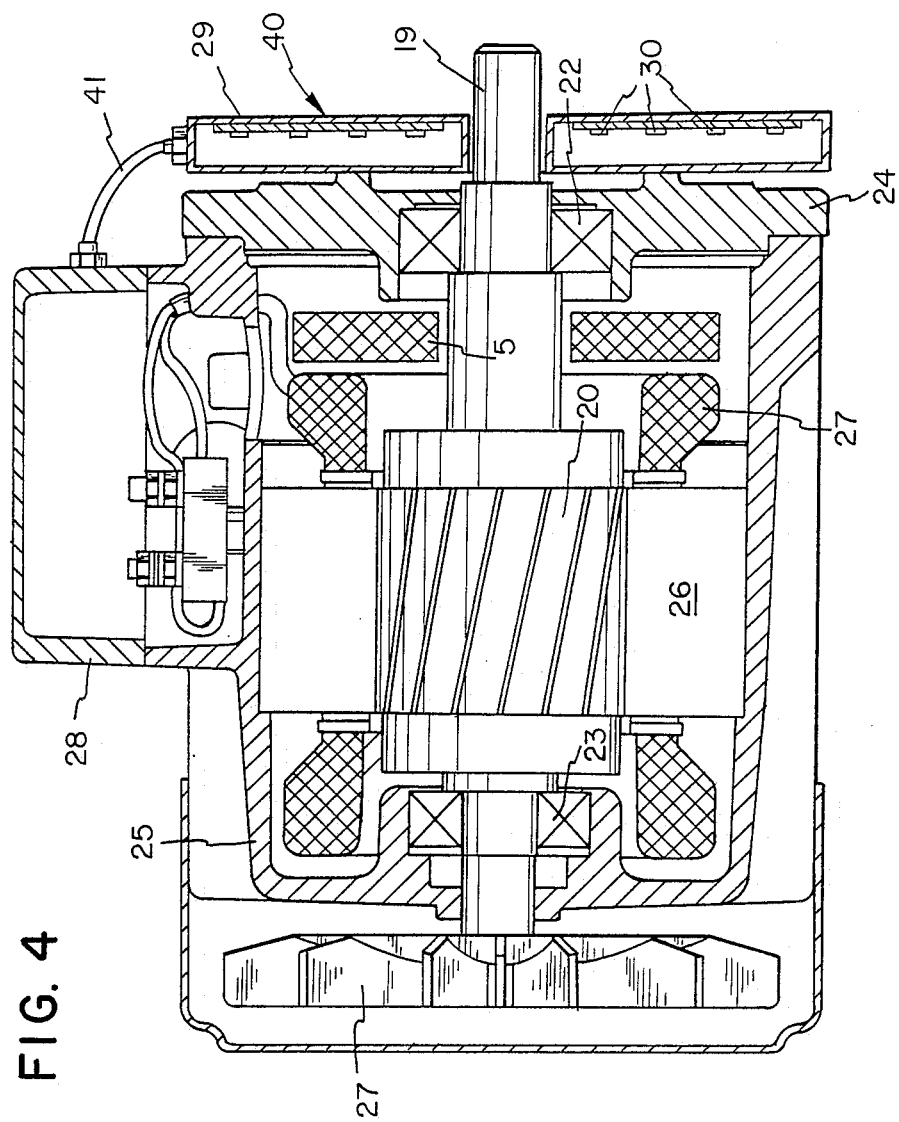

In the embodiment of FIG. 4 the intermediate circuit in the form of the inductance 5 is a toroid situated in the motor housing 25 and concentrically surrounding the motor shaft 19. If the motor shaft is at least in this area made of steel, it can form the core of the toroid. The intermediate circuit and the other circuits of the frequency converter are also in this embodiment separately installed. The input and output circuits 30 form a module 40 encased in a casing. The outside of said module is attached to the motor housing or the motor cover 24. The module is connected to corresponding contacts in the terminal box 28 via a shielded cable 41 in order to connect the output circuit of the frequency converter to the windings 27. In this embodiment the casing of the module 40 is situated close to the motor cover 24, creating a free space, cf. FIG. 4, for the flow of convection air.

Figure 5:
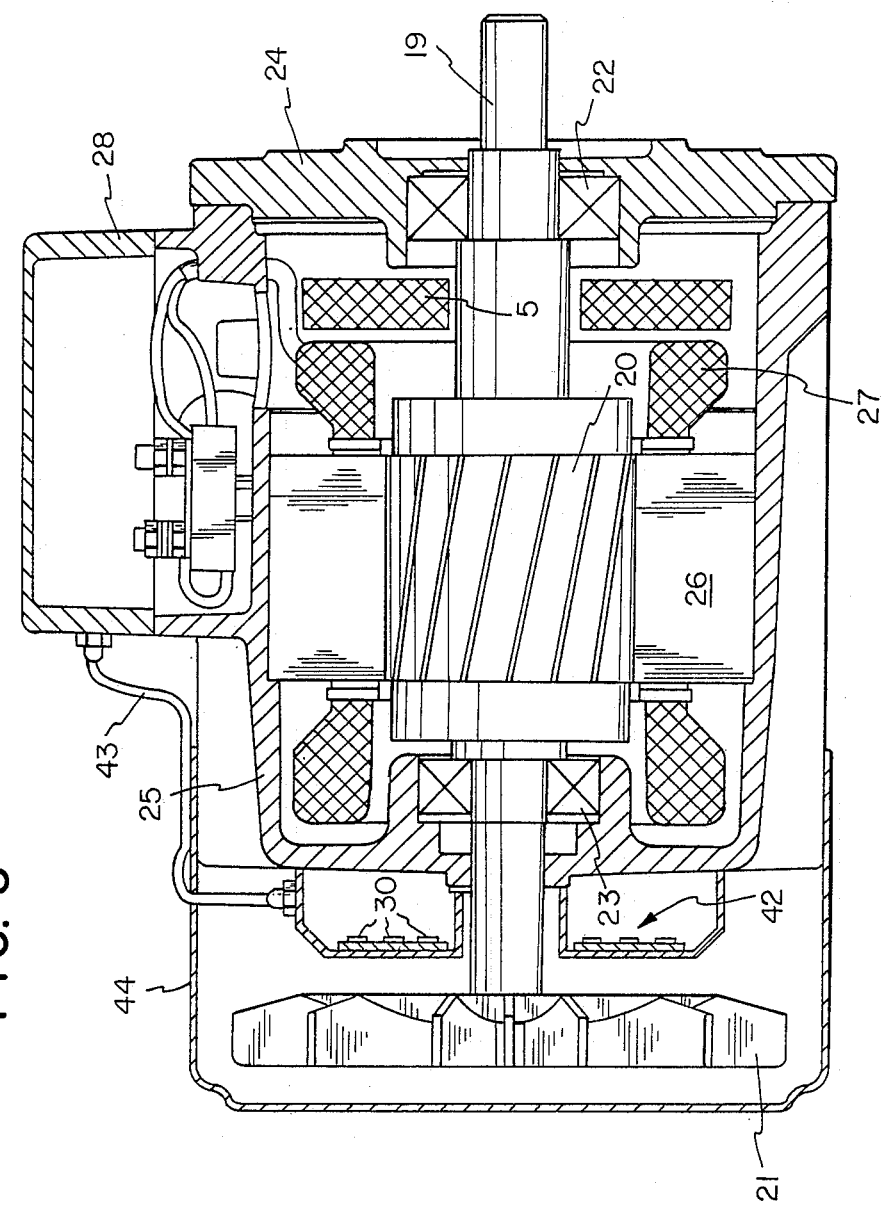

In the embodiment of FIG. 5 the input and output circuits 30 of the frequency converter also form a module 42 connected to corresponding contacts in the terminal box 28 via a cable 43. In this embodiment the module is situated in the ventilator housing 44 between the rotor 21 and the motor housing 25. This allows the cooling air caused by the rotor to flow across the module 42 for absorbing the dissipation heat of the frequency converter. The intermediate circuit in the form of the inductance 5 is arranged in the same way as in the embodiment of FIG. 4.

Figure 6:
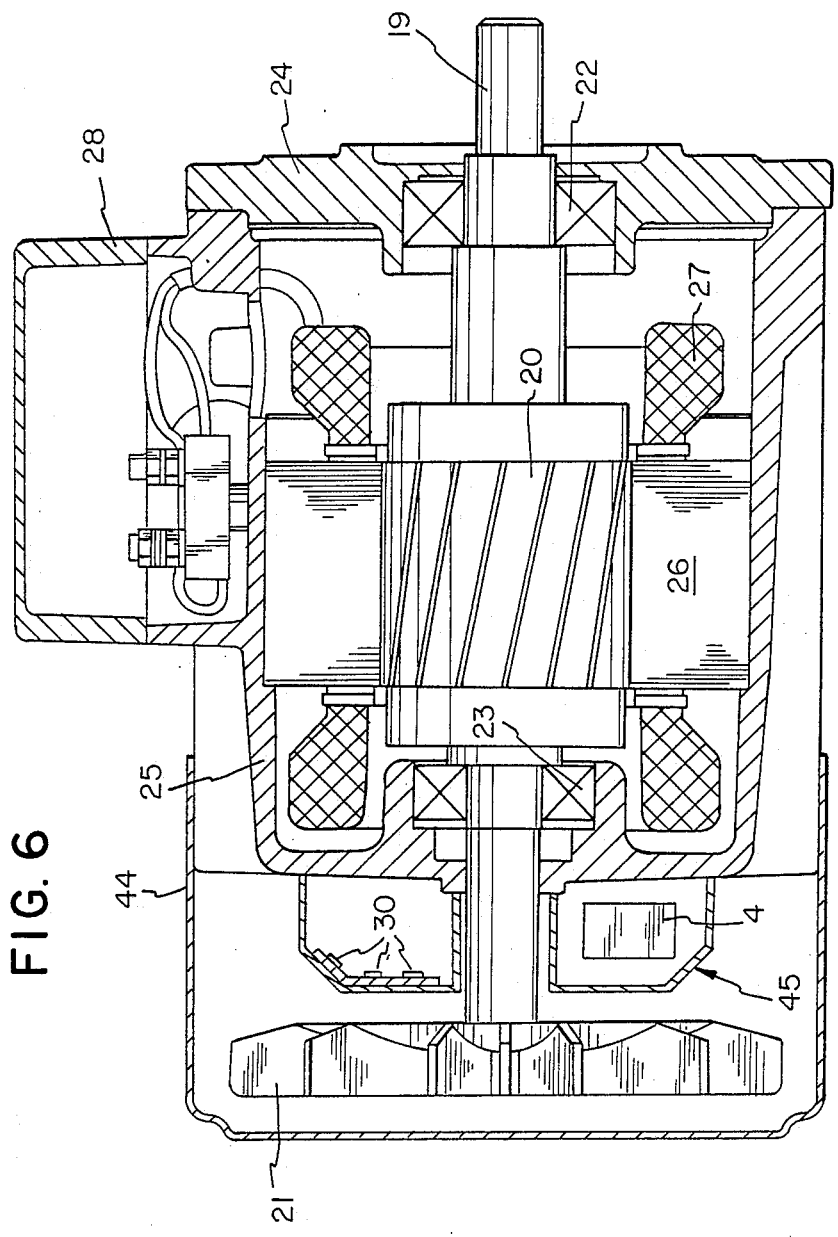

FIG. 6 illustrates a solution where all parts of the frequency converter, i.e. also the capacitor 4 constituting the intermediate circuit, form a module 45 in a casing, said casing concentrically surrounding the shaft 19. The module is situated in the ventilator housing 44 between the rotor 21 and the opposite frontal side of the motor housing 25.

Yet another possibility for arranging the frequency converter is illustrated in FIG. 7. In this case the electric circuits of the frequency converter are attached inside the ventilator housing by means of a support 46. The circuits form a module connected to the corresponding contacts in the terminal box 28 via a cable 47. The input circuit of the frequency converter is supplied with current via said contacts and said cable, and the output circuit is connected to the motor windings via the same contacts and cable. The cable 47 can, of course, also provide the necessary connection to internal and external sensors.

The cooling air stream caused by the rotor 21 flows across the inwardly directed surface of the support 46 to absorb the dissipation heat of the frequency converter not yet emitted via the other walls of the ventilator housing surrounding the frequency converter.

If the motor forms a structural unit with a working machine, such as a pump, a ventilator or the like, the electric circuits of the frequency converter can, of course, also be partially or completely installed on the working machine, while the other parts are situated in the motor.

As mentioned above the frequency converter is adequately shielded if it is situated in a metallic motor or ventilator housing or if the parts surrounding the frequency converter, such as the housing of the terminal box or the casing of the module, are either of metal or at least provided with a metal lining connected to ground. For the same reason connections between the separately arranged circuits of the frequency converter or between the frequency converter and the motor windings are to be shielded if they are outside the above housing.

We claim:

1. In an electric motor wherein the operational parameters comprising rpm and torque are varied by means of a static frequency converter, especially an electric motor in combination with a device driven thereby, such as a pump, a fan, a machine tool or a power tool, said motor having a shaft and a ventilator attached to said shaft for cooling the motor windings, wherein the frequency converter, which is miniaturized by the use of highly integrated circuitry, is joined mechanically to the motor to form a constructional unit and wherein the waste heat of the frequency converter can be dissipated by cooling, the improvement wherein a ventilator housing is mounted on said motor housing, said ventilator being arranged in a space between said ventilator housing and motor housing, said ventilator housing and said motor housing having respective portions which form a channel means for guiding the cooling air stream generated by rotation of said ventilator, and wherein a terminal box of the motor is attached to the motor housing of the motor with free spacing so that a radially external free space is formed between the terminal box and the motor housing for carrying the cooling air stream generated by the ventilator and guided by said channel means, said terminal box receiving at least part of said frequency converter.

2. An electric motor according to claim 1, wherein the frequency converter comprises an input circuit, an intermediate circuit and an output circuit, the input circuit, the intermediate circuit and the output circuit of the frequency converter forming a module equipped with electric plug connectors.

* * * * *